May 26, 1970     E. H. SAVELA     3,513,519
ROLLER FOR TRANSPORTING SHEET MATERIAL
Filed Nov. 6, 1967
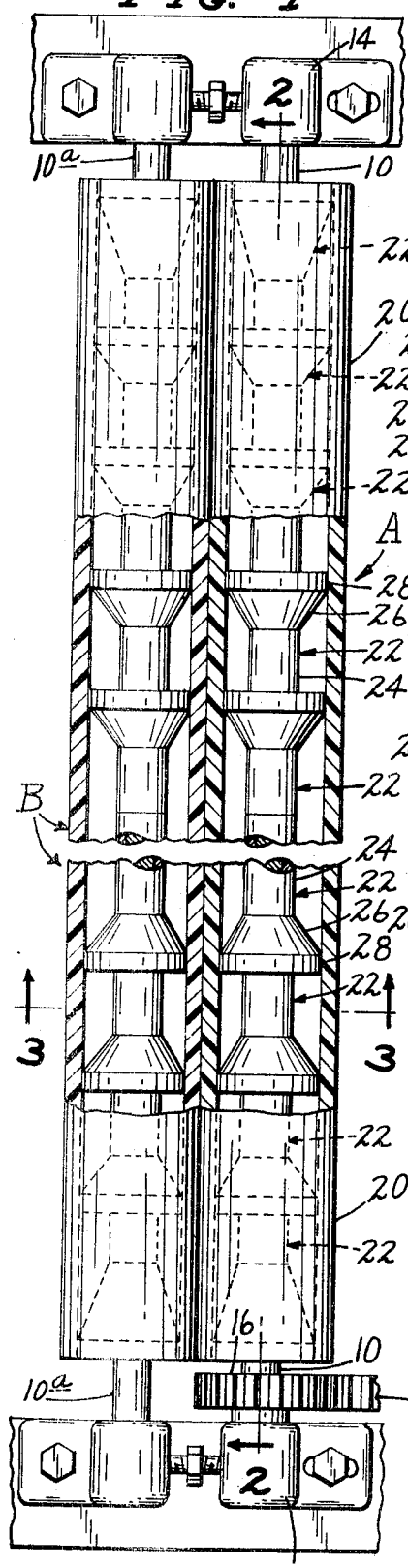
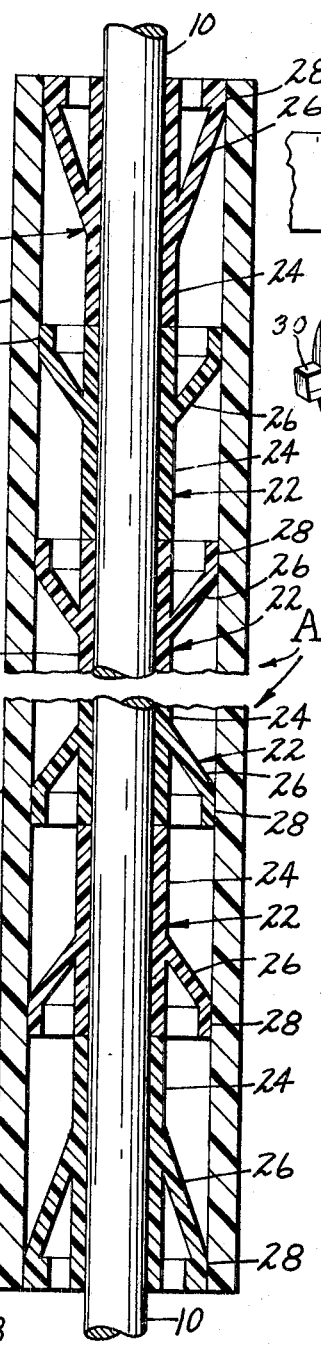
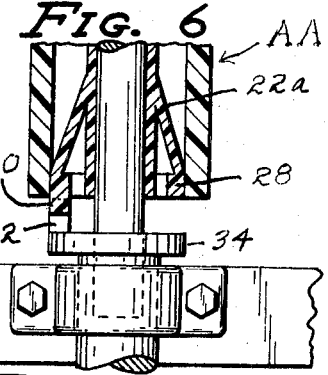
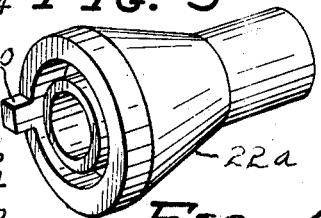
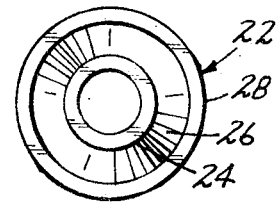
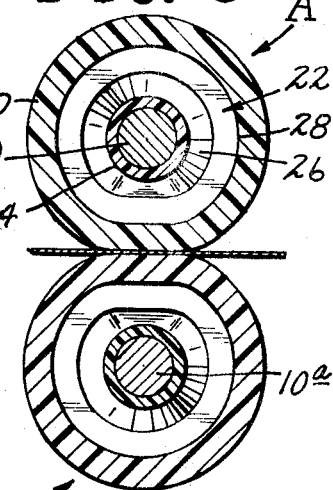
INVENTOR.
EDWARD H. SAVELA
BY
Carlsen, Carlsen, Sturm & Hicks
ATTORNEYS

United States Patent Office 3,513,519
Patented May 26, 1970

3,513,519
ROLLER FOR TRANSPORTING SHEET MATERIAL
Edward H. Savela, Golden Valley, Minn., assignor to Pako Corporation, Minneapolis, Minn., a corporation of Minnesota
Filed Nov. 6, 1967, Ser. No. 684,591
Int. Cl. B21b *31/08;* B65h *5/06*
U.S. Cl. 29—125          3 Claims

ABSTRACT OF THE DISCLOSURE

A roller for transporting sheet film and the like including a substantially rigid shaft, a multiplicity of resilient annular support members mounted on the shaft and a resilient tubular member mounted on and concentric with said support members.

SUMMARY OF THE INVENTION

The invention relates to an improvement in rollers for transporting sheet material therebetween and more particularly to rollers for transporting thin material such as photographic film and the like. Known rollers for transporting film include a relatively firm cylindrical body of plastic, hard rubber and the like mounted on a rigid metal shaft. With such a type of roller of substantial length the ends of the shaft must be mounted in resilient mounts to maintain contact throughout the length of the roller. Without resilient mounts at the ends of the shafts the shafts tend to bow and driving contact is not maintained throughout the length of the rollers.

It is an object of the invention to provide a roller having a resilient body of a nature whereby contact with a companion roller may be maintained throughout the length although the roller has a relatively elongated shaft. It is a further object to provide a roller of- the above type with which sheet material of different thicknesses can be transported at spaced points between the rollers with roller contact maintained on the different material.

These and other more detailed and specific objects will be disclosed in the course of the following specification, reference being had to the accompanying drawing, in which:

FIG. 1 is a top plan view of a pair of rollers embodying the invention, portions thereof being broken away, other portions being shown in section.

FIG. 2 is an enlarged longitudinal section on the line 2—2 of FIG. 1.

FIG. 3 is a sectional view on the line 3—3 of FIG. 1 with a portion of a sheet shown therebetween.

FIG. 4 is an end view of one of the supports removed from the roller.

FIG. 5 is a perspective view of one of the supports removed from the roller.

FIG. 6 is a sectional view through an end support having a lug formed thereon for rotating the support and the tubular roller member thereon.

Referring to the drawings in detail, the roller A includes the shaft 10, the ends of which are mounted in the bearings 12 and 14. The shaft 10 has mounted thereon the gear 16 which is driven by the driving gear 18, the means for driving gear 18 not shown. The roller further includes the elongated tubular resilient body 20 which may be made of plastic or the like.

Mounted on the shaft 10 for the resilient support of the tubular body 20 are a multiplicity of spaced resilient support members 22. Each support member 22 includes a hollow cylindrical base portion 24, the inside diameter of which is substantially the outside diameter of the shaft 10. Extending outwardly from the base portion 24 intermediate the ends thereof is hollow frustoconical portion 26. The outer end of the portion 26 terminates in the resilient annular shoulder 28, the outer surface of which is parallel to the longitudinal axis of the base portion 24. The portion 26 allows for deflection and further resiliency in the annular shoulder 28. The outer diameter of the annular shoulder is substantially that of the inner diameter of the body 20. The length of the cylindrical base portion 24 is equal to or greater than the length of the frustoconical portion 26 so that when the outer ends of one base portion abut the ends of the base portions of adjacent supports the annular shoulders 28 are thereby automatically spaced and securely positioned within the tubular body member 20. With the support members so positioned, the same will not tend to creep upon the shaft and within the tubular body 20.

To prevent the tendency to creep of the supports 22 on the shaft toward one end thereof, half of the supports 22 are positioned on the shaft with the open end of the conical portion 26 facing one end of the shaft 10 and the other half with the open end of the conical portion facing the opposite end of the shaft.

The support 22 forming the end closure and support is of the same construction as the intermediate supports but of increased length. The supports 22 are made of resilient plastic and the base portion 24 of each is secured upon the shaft 10 by friction, abutting an adjacent support or by an adhesive or the like. The cylindrical body member 20 may be secured upon the supports 22 by adhesive, heat-sealing or the like on the annular portions 28 of the supports.

A companion roller B is shown adjacent roller A, the construction of which is identical to roller A, the pair used to transport sheet material therebetween. The roller B may be of a one-piece construction and used in conjunction with a roller A for transporting sheet material.

It will be seen in FIG. 3 how the rollers A and B compress or give at the point of contact and this is accomplished without any distortion or bowing of the shafts 10 and 10a. Roller contact is maintained throughout the length of the roller thereby allowing the transporting of sheet film at any and all points throughout the length of the roller. Due to the resiliency of the roller sheet film or the like of different thicknesses may be transported at different points along a single roller.

Referring to FIG. 6 there is shown a further embodiment of an annular end support in 22a, identical to support 22 but with the annular shoulder 28a formed with a lug 30 extending therefrom. The lug 30 is contacted by a rotating member such as the short arm 32 of the rotating member 34 whereby the roller AA is rotated upon shaft 36 thereof.

It is understood that suitable modification may be made in the structure as disclosed, provided such modifications come within the spirit and scope of the appended claims. Having now therefore fully illustrated and described my invention, what I claim to be new and desire to protect by Letters Patent is:

1. A roller for transporting sheet material comprising:
   (a) a shaft,
   (b) resilient support members,
   (c) means mounting each of said support members on said shaft,
   (d) a resilient tubular member,
   (e) means mounting said tubular member on said support members concentric with said shaft,
   (f) said support mounting means including a base portion having a bore through which the shaft extends,
   (g) said support mounting means including a resilient annular shoulder,
   (h) resilient means connecting said annular shoulder with said base portion, (i) said resilient connecting means including a single frusto-conical portion, (j) said base portion of said support mounting means being at least equal to the length of said frusto-conical portion whereby the annular shoulders are spaced with the base portions in endwise abutment.

2. The device of claim 1 in which said means mounting said tubular member on said support mounting means includes a connection with said annular shoulders.

3. The device of claim 2 in which said connection is adhesive.

References Cited

UNITED STATES PATENTS 3,300,835  1/1967  Barr _____ 29—121

FOREIGN PATENTS 304,098    1/1929   Great Britain.
203,839   10/1956   Australia.
1,032,184  6/1958   Germany.

WALTER A. SCHEEL, Primary Examiner

L. G. MACHLIN, Assistant Examiner